US012781984B2

(12) United States Patent
Bekhit et al.

(10) Patent No.: US 12,781,984 B2
(45) Date of Patent: Nov. 3, 2026

(54) ELECTRICAL LOAD MANAGEMENT USING THERMAL COMFORT

(71) Applicant: ICF International, Inc., Fairfax, VA (US)

(72) Inventors: Ahmed Bekhit, Burlington (CA); Mohamed Abdelsalam, Hamilton (CA); Haider Khan, Oakville (CA); Vincent Dufresne, Verdun (CA); Steven Fine, Rockville, MD (US)

(73) Assignee: ICF INTERNATIONAL, INC., Fairfax, VA (US)

(*) Notice: Subject to any disclaimer, the term of this patent is extended or adjusted under 35 U.S.C. 154(b) by 292 days.

(21) Appl. No.: 18/791,978

(22) Filed: Aug. 1, 2024

(65) Prior Publication Data

US 2025/0052440 A1 Feb. 13, 2025

Related U.S. Application Data

(60) Provisional application No. 63/518,585, filed on Aug. 10, 2023.

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/64* (2018.01); *F24F 2110/10* (2018.01); *F24F 2110/20* (2018.01); *F24F 2110/30* (2018.01); *F24F 2120/14* (2018.01); *G05B 13/04* (2013.01); *G05B 15/02* (2013.01)

(58) Field of Classification Search
None
See application file for complete search history.

(56) References Cited

U.S. PATENT DOCUMENTS 7,373,222 B1 5/2008 Wright et al.
7,430,459 B1 9/2008 Papalia et al.
(Continued)

FOREIGN PATENT DOCUMENTS

CA 2289237 C * 11/2004 .............. F24F 11/30
CN 111046536 A * 4/2020 ............. G06F 30/20
(Continued)

OTHER PUBLICATIONS

Zahid et al., "Dynamic Predicted Mean Vote: An IoT-BIM integrated approach for indoor thermal comfort optimization", Automation in Construction 129 (2021) 103805. (Year: 2021).*
(Continued)

*Primary Examiner* — Mohammad Ali
*Assistant Examiner* — Kelvin Booker
(74) *Attorney, Agent, or Firm* — Fredrikson & Byron, P.A.

(57) ABSTRACT

A method for electrical demand management and/or reduction includes the steps of determining a thermal comfort index for a premises, dispatching a thermostat setpoint signal to the premises to cause an electrical demand reduction event at the premises, and terminating the electrical demand reduction event at the premises prior to a time at which a thermal response model for the premises indicates a temperature inside the premises exceeds the thermal comfort index for the premises.

16 Claims, 11 Drawing Sheets

(51) Int. Cl.

| | |
|---|---|
| ***G05B 13/04*** | (2006.01) |
| ***G05B 15/02*** | (2006.01) |
| *F24F 110/10* | (2018.01) |
| *F24F 110/20* | (2018.01) |
| *F24F 110/30* | (2018.01) |
| *F24F 120/14* | (2018.01) |

(56) References Cited

U.S. PATENT DOCUMENTS

| | | | | |
|---|---|---|---|---|
| 7,590,472 | B2 | 9/2009 | Hakim et al. | |
| 7,612,466 | B2 | 11/2009 | Skutt | |
| 7,660,649 | B1 | 2/2010 | Hope et al. | |
| 7,698,233 | B1 | 4/2010 | Edwards et al. | |
| 7,860,702 | B1 | 12/2010 | Evans et al. | |
| 8,019,445 | B2 | 9/2011 | Marhoefer | |
| 8,019,697 | B2 | 9/2011 | Ozog | |
| 8,068,938 | B2 | 11/2011 | Fujita | |
| 8,195,337 | B2 | 6/2012 | Cruickshank, III | |
| 8,359,124 | B2 | 1/2013 | Zhou et al. | |
| 8,583,405 | B2 | 11/2013 | Chow et al. | |
| 8,600,571 | B2 | 12/2013 | Dillon et al. | |
| 8,645,285 | B2 | 2/2014 | Boot | |
| 8,706,650 | B2 | 4/2014 | Ozog | |
| 8,725,625 | B2 | 5/2014 | Anderson et al. | |
| 8,751,421 | B2 | 6/2014 | Isaac et al. | |
| 8,762,196 | B2 | 6/2014 | Sharma et al. | |
| 8,782,190 | B2 | 7/2014 | Koch | |
| 8,886,361 | B1 | 11/2014 | Harmon et al. | |
| 8,903,560 | B2 | 12/2014 | Miller | |
| 8,996,181 | B2 | 3/2015 | Razum et al. | |
| 9,256,908 | B2 | 2/2016 | Dai et al. | |
| 9,261,863 | B2 * | 2/2016 | Sloop | G05D 23/1917 |
| 9,300,137 | B2 | 3/2016 | Cherian et al. | |
| 9,300,141 | B2 | 3/2016 | Marhoefer | |
| 9,324,116 | B2 | 4/2016 | Cherian | |
| 9,336,338 | B2 | 5/2016 | Legbedji et al. | |
| 9,366,704 | B2 | 6/2016 | Haghighat-Kashani et al. | |
| 9,395,707 | B2 | 7/2016 | Anderson et al. | |
| 9,424,614 | B2 | 8/2016 | Bhageria et al. | |
| 9,454,141 | B2 | 9/2016 | Friedrich et al. | |
| 9,577,434 | B2 | 2/2017 | Glomb et al. | |
| 9,638,831 | B1 | 5/2017 | Hoff | |
| 9,639,103 | B2 | 5/2017 | Darden, II et al. | |
| 9,727,828 | B2 | 8/2017 | Sun et al. | |
| 9,798,298 | B2 | 10/2017 | Kaulgud et al. | |
| 9,805,321 | B2 | 10/2017 | Guthridge | |
| 9,805,325 | B2 | 10/2017 | Ippolito et al. | |
| 9,807,099 | B2 | 10/2017 | Matsuoka et al. | |
| 9,853,448 | B2 | 12/2017 | Fan et al. | |
| 10,049,373 | B2 | 8/2018 | Takahashi et al. | |
| 10,101,050 | B2 | 10/2018 | Radovanovic et al. | |
| 10,116,134 | B2 | 10/2018 | Forbes, Jr. | |
| 10,191,096 | B2 | 1/2019 | Cheng et al. | |
| 10,204,183 | B2 | 2/2019 | Hinners et al. | |
| 10,261,535 | B2 | 4/2019 | Boardman et al. | |
| 10,274,525 | B2 | 4/2019 | Savvides et al. | |
| 10,298,012 | B2 | 5/2019 | Main et al. | |
| 10,387,926 | B2 | 8/2019 | Li et al. | |
| 10,418,822 | B2 | 9/2019 | Sun | |
| 10,445,673 | B1 | 10/2019 | Hofmann et al. | |
| 10,447,035 | B2 | 10/2019 | Matsuda et al. | |
| 10,460,274 | B2 | 10/2019 | He et al. | |
| 10,460,360 | B2 | 10/2019 | Wayne et al. | |
| 10,475,138 | B2 | 11/2019 | Brockman et al. | |
| 10,488,829 | B2 | 11/2019 | Sun et al. | |
| 10,514,179 | B2 | 12/2019 | Hieke et al. | |
| 10,515,308 | B2 | 12/2019 | Li et al. | |
| 10,523,008 | B2 | 12/2019 | Rive et al. | |
| 10,559,044 | B2 | 2/2020 | Liptsey-Rahe | |
| 10,566,927 | B2 | 2/2020 | Hinners et al. | |
| 10,572,797 | B2 | 2/2020 | Kim et al. | |
| 10,599,747 | B1 | 3/2020 | Hoff | |
| 10,614,146 | B2 | 4/2020 | Song et al. | |
| 10,630,502 | B2 | 4/2020 | Shyr et al. | |
| 10,645,770 | B2 | 5/2020 | Shah et al. | |
| 10,657,110 | B2 | 5/2020 | Gupta et al. | |
| 10,719,797 | B2 | 7/2020 | Foster | |
| 10,739,742 | B2 | 8/2020 | Kumar et al. | |
| 10,749,339 | B2 | 8/2020 | Meier | |
| 10,770,897 | B1 | 9/2020 | Hertz-Shargel et al. | |
| 10,770,901 | B2 | 9/2020 | Bright et al. | |
| 10,789,396 | B1 | 9/2020 | Hoff | |
| 10,796,254 | B2 | 10/2020 | Aganagic et al. | |
| 10,797,483 | B2 | 10/2020 | Niemi et al. | |
| 11,675,322 | B2 * | 6/2023 | Du | F24F 11/46 700/278 |
| 11,788,755 | B2 * | 10/2023 | Nabi | G05B 13/042 700/278 |
| 11,892,187 | B2 * | 2/2024 | Trinh | F24F 11/0008 |
| 2008/0262857 | A1 | 10/2008 | Perera | |
| 2010/0064001 | A1 | 3/2010 | Daily | |
| 2013/0190940 | A1 * | 7/2013 | Sloop | G05D 23/1917 700/291 |
| 2015/0192911 | A1 * | 7/2015 | Sloop | G05D 23/1917 700/291 |
| 2016/0004805 | A1 | 1/2016 | Drees et al. | |
| 2016/0042377 | A1 | 2/2016 | Ilic et al. | |
| 2018/0238572 | A1 * | 8/2018 | Murugesan | F24F 11/30 |
| 2021/0102722 | A1 * | 4/2021 | Nabi | F24F 11/46 |
| 2021/0285671 | A1 * | 9/2021 | Du | F24F 11/46 |
| 2021/0302052 | A1 * | 9/2021 | Trinh | F24F 11/0008 |
| 2023/0228446 | A1 | 7/2023 | Lee et al. | |

FOREIGN PATENT DOCUMENTS

| | | | | | |
|---|---|---|---|---|---|
| JP | 2018506689 | A | * | 3/2018 | G05B 15/02 |
| KR | 20180082934 | A | * | 7/2018 | F24F 11/00 |
| WO | WO-2015049664 | A1 | * | 4/2015 | G01W 1/17 |
| WO | WO-2019033146 | A1 | * | 2/2019 | F24F 11/57 |

OTHER PUBLICATIONS

Yau et al., "A review on predicted mean vote and adaptive thermal comfort models", Building Serv. Eng. Res. Technol. 2014, vol. 35(1) 23-35. (Year: 2014).*

Desogus et al., "From Building Information Model to Digital Twin: A Framework for Building Thermal Comfort Monitoring, Visualizing , and Assessment", May 2023, Buildings 2023, 13, 1971. (Year: 2023).*

Ku et al., "Automatic Control System for Thermal Comfort Based on Predicted Mean Vote and Energy Saving", IEEE Transactions on Automation Science and Engineering, vol. 12, No. 1, Jan. 2015. (Year: 2015).*

Han et al., "Thermal comfort control based on a simplified Predicted Mean Vote index", Energy Procedia 61 (2014) 970-974. (Year : 2014).*

Dyvia et al., "Analysis of thermal comfort with predicted mean vote (PMV) index using artificial neural network", 2021 IOP Conf. Ser.: Earth Environ. Sci. 622 012019. (Year: 2021).*

Cigler et al., "Optimization of Predicted Mean Vote index within Model Predictive Control framework: Computationally tractable solution", Energy and Buildings 52 (2012) 39-49. (Year: 2012).*

Hosamo et al., "Digital Twin of HVAC system (HVACDT) for multiobjective optimization of energy consumption and thermal comfort based on BIM framework with ANN-MOGA", Jun. 2022, Advances in Building Energy Research. (Year: 2022).*

International Searching Authority "International Search Report and Written Opinion" From Application No. PCT/US2024/040543, Mailed Oct. 18, 2024, pp. 12.

* cited by examiner

ELECTRICAL LOAD MANAGEMENT USING THERMAL COMFORT

RELATED APPLICATION

This disclosure claims priority to U.S. provisional patent application No. 63/518,585, filed on Aug. 10, 2023, the entire contents of which are hereby incorporated by reference.

TECHNICAL FIELD

This disclosure relates generally to distributed energy resource ("DER") management. Embodiments disclosed herein can implement flexible electric load management in a manner that leverages premises thermal response and premises occupant thermal comfort to improve the efficiency and effectiveness of electrical load management events.

BACKGROUND

To meet society's ambitious decarbonization goals, the electricity grid will need to follow two main paths: moving away from fossil fuel electricity generation and enabling the electrification of end uses that have traditionally used fossil fuels such as transportation and building heating. As more fossil fuel plants are retiring, they are replaced with renewable resources which are intermittent in nature and harder to predict in comparison with dispatchable power plants. The second path of load electrification increases electricity demand. Yet this increase in electricity demand may or may not coincide with variable renewable energy generation.

SUMMARY

The given imbalance between electricity generation and demand can be addressed using methods of flexible load management that can shape energy demand continuously and for extended durations. This degree of flexible control is not provided by traditional demand response load management strategies that target a few users for a few hours of the year, usually when the system load is peaking, to provide temporary relief to the grid.

In general, the disclosure describes embodiments of methodologies, devices, systems, non-transitory computer-executable instructions, and apparatuses for a technology-enabled solution that flexibly manages premises' (e.g., residential and small to medium business ("SMB")) customers' electrical loads in a manner that can minimize, or in some instances prevent, discomfort to the premises customers' during the load management event. Such embodiments disclosed herein can, for instance, aggregate load management for thousands/millions of customers, and for some embodiment also their connected devices, across one or more electrical grids to meet predetermined electrical load management objectives (e.g., to meet predetermined electrical load management objectives aggregated across one or more such customers and/or one or more electrical grids, for instance, to provide grid-level peak demand relief).

Embodiments disclosed herein, when executed, can reduce electricity demand on both the wholesale system as well as at the more geographically granular level of the electrical distribution grid by flexibly managing the behind-the-meter ("BTM") loads (e.g., discharging Battery Energy Storage System ("BESS")), electric vehicle ("EV") charging, or heating, ventilation, and air conditioning ("HVAC") systems) across many targeted customers/premises whose consumption profiles, when aggregated, can match the total predetermined targeted demand reduction. The aggregated impact can reduce the load during times when the grid is congested, for instance, at parts of the grid that are constrained. In various such embodiments, the duration of load management for each premises (e.g., household) can be determined based on the expected load reduction from the household, comfort limits, and the targeted total demand profile after management.

Across the range of behind-the-meter loads that embodiments disclosed herein can be utilized to flexibly manage in a way that meets predetermined electrical demand reduction levels on the electrical grid, embodiments disclosed herein include embodiments that leverage flexible load management of distributed resources at a premises (e.g., HVAC system flexible load management) as well as applied more broadly across a plurality of premises (e.g., hundreds or thousands of premises)). For example, modern HVAC systems are typically controlled with smart thermostats. A given such modern HVAC system runs to meet the internal setpoint, and the electrical load associated with that HVAC system can be managed by adjusting the setpoint for a given time duration across many electrical consumption devices to alter the total electrical load. Load change can vary for each premises depending on the impact of the load management event on the internal thermal comfort level. As described herein, a model can be developed to predict the thermal response of the premises and the resulting change in the thermal comfort level of occupants of that premises due to the event of system management by changing the HVAC system temperature setpoint. This model can predict the maximum duration of the event above which the occupant would likely override the setpoint changes. A similar example of DER load management is water heaters, which function as thermal storage systems with setpoint and controller to keep the water at a desired temperature. While similar in nature, the model for water heaters takes into account the hot water draw profile, the heat losses from the hot water system and the occupants' preferences for hot water temperature.

This type of flexible load management as disclosed herein can provide improved efficiencies and effectiveness as compared to prior approaches to demand reduction events. Prior load management programs typically act to turn off the HVAC system by setting back the thermostat setpoint for an extended period (e.g., 2-4 hours) which often causes customer discomfort and might lead the customer to opt out of the event or the program prematurely. The impact of extended setback durations of these prior approaches has diminishing benefits due to customer over-rides as well as load increases after the demand response event due to the significant snapback (recovery period) after the event which can cause a second peak. For example, the different approach described herein can provide improved efficiencies and effectiveness as compared to these prior approaches by implementing flexible DER load management in a manner that leverages predictive modeling of thermal response and thermal comfort (e.g., of each individual premise and applied across a plurality of premises in an individualized manner) to help improve the efficiency and effectiveness of electrical load management.

One embodiment of the approach disclosed herein includes a method. This method embodiment includes the steps of determining a thermal comfort index for a premises; dispatching a thermostat setpoint signal to the premises to cause an electrical demand reduction event at the premises; and terminating the electrical demand reduction event at the premises prior to a time at which a thermal response model for the premises indicates a temperature inside the premises exceeds the thermal comfort index for the premises. For instance, in one further application of this method embodiment, the method can include the steps of developing a thermal response model for the premises; determining a thermal comfort index for the premises; representing the occupants' satisfaction with the thermal conditions; dispatching a thermostat setpoint change signal to the HVAC system at the premises to cause an electrical demand reduction event (e.g., at the premises); and terminating the electrical demand reduction event at the premises prior to a time at which the thermal response model for the premises indicates that the thermal comfort index for the premises exceeds acceptable limits.

One specific embodiment of thermal response modeling of a premises can include creating a digital twin model for the premises itself. Digital twining can include the process of calibrating a building energy model ("BEM") for the premises of interest using its energy consumption data. The disclosed digital twining approach is novel and unique compared to traditional approaches. Traditional calibration workflow is a tedious iterative task that involves identifying impactful parameters by designing a sensitivity analysis experiment, changing inputs and monitoring outputs until error metrics between actual and simulated energy consumption are minimized. This often requires running hundreds of BEM simulations (e.g., OpenStuido software) varying several operational and asset parameters until the predicted consumption profiles align with the actual ones.

This disclosed digital twin framework can search through prototypical residential models for a representative residential model that exhibits a similar consumption profile to that of the actual building. The degree of similarity is measured using two statistical indices; the Coefficient of the Variation of the Root Mean Square Error ("CVRMSE") and the Normalized Mean Bias Error ("NMBE"). The tolerances for these as per ASHRAE Guideline 14 are: 30% for CVRMSE, ±10% for NMBE for hourly data; and 15% CVRMSE, ±5% NMBE for monthly data. The more characteristics that are known for the premises, the narrower the search window can be set to compare only the models that share the same building characteristics. For example, if we know that the house of interest has a floor area of 1300 square feet, then we can select only prototypical models with the same floor area as potential digital twins for comparison. This reduces the probability of obtaining false positive results.

For various such embodiments, the energy consumption data can be obtained from Advanced Metering Infrastructure ("AMI") which is available in monthly or hourly intervals. For monthly AMI data, the CVRMSE and NMBE are evaluated using the monthly consumption values from the actual building and the prototypical model simulations. For hourly AMI data, the data is aggregated to daily and monthly levels, then the CVRMSE and NMBE are evaluated for both daily and monthly consumptions. A Pareto front optimization technique is then applied to minimize the CVRMSE and the NMBE. This results in a reduced dataset that provides the closest representation of the actual building consumption profile. The CVRMSE and NMBE are combined using the root sum of squares of the weighted errors, then the model with the smallest combined error is deemed to be the digital twin for the actual home. The digital twin can then be identified as the model that demonstrates the smallest combined error. That model can then be simulated to examine the impact of the flexible load management event on the energy consumption and the thermal comfort index.

Another embodiment of thermal response modeling of a premises can include creating an n-order thermal model of the premises that is calibrated against the AMI consumption data. The model simulates the variation of temperature inside the premises as a result of external ambient air conditions. Such a method can additionally include steps of: using the thermal response model to estimate the temperature inside the premises while the electrical demand reduction event is active; and using the determined thermal comfort index to estimate a predetermined temperature range inside the premises at which a thermal comfort level of an occupant of the premises will be satisfied. And, in such a method embodiment, the electrical demand reduction event can be terminated prior to the estimated temperature inside the premises, while the electrical demand reduction event is active, falling outside of the predetermined temperature range. For instance, according to one such method embodiment, a zero-order thermal response model can estimate the temperature inside the premises while the electrical demand reduction event is active using an estimated rate of heat gain, $\dot{Q}_{in}$, that is determined for the premises as follows:

$$\dot{Q}_{in} = \dot{Q}_{HVAC} + C\frac{dT}{dt}$$

wherein: $\dot{Q}_{HVAC}$ is a rate of heat removal at the premises caused by a HVAC system at the premises; C is a thermal capacity of the premises; and $$\frac{dT}{dt}$$

is the rate of change of inside air temperature.

In one such example of this method embodiment (e.g., during normal operation of the HVAC system), $$\frac{dT}{dt} \approx 0,$$

and $\dot{Q}_{HVAC}=U(T_{outdoors}-T)$, with U being a heat transfer coefficient for the premises, T being an indoor air temperature within the premises, and $T_{outdoors}$ being an outdoor ambient air temperature outside the premises.

For various such thermal response modeling embodiments, the thermal comfort index for the premises can be determined using two or more factors selected from the group consisting of: (a) an average air temperature adjacent an occupant of the premises; (b) a mean radiant temperature that quantifies an exchange of radiant heat between the occupant of the premises and an ambient environment within the premises surrounding the occupant; (c) humidity within the premises; (d) air speed within the premises; (e) a metabolic rate of the occupant of the premises; and (f) a clothing insulation of the occupant of the premises. As one such example, the thermal comfort index for the premises can be determined using each of (a), (b), (c), (d), (c), and (f).

The electrical demand reduction event can be terminated at the premises prior to the time at which the thermal response model for the premises indicates the temperature inside the premises falls outside a predicted mean vote index ranging from −0.5 to +0.5.

In a further embodiment of this method, terminating the electrical demand reduction event at the premises prior to the time at which the thermal response model for the premises indicates the temperature inside the premises exceeds the thermal comfort index for the premises can include utilizing historical data associated with previous instances in which the thermostat setpoint signal was dispatched to the premises to cause previous electrical demand reduction events at the premises.

In a further embodiment of this method, the method can additionally include forming a cohort of premises using electrical demand data associated with each of the premises, where the thermal comfort index is determined for each premises of the cohort of premises, where the thermostat setpoint signal is dispatched to each premises of the cohort of premises, and where the electrical demand reduction event is terminated at each premises of the cohort of premises prior to a time at which the thermal response model for each premises of the cohort of premises indicates a temperature inside each premises of the cohort of premises exceeds the thermal comfort index for each premises of the cohort of premises. In one such exemplary embodiment, premises-related electrical demand data can be aggregated for a plurality of premises, and the cohort of premises can be formed as a subset of the plurality of premises as those premises having electrical demand data best correlated to a predetermined electrical demand reduction event.

In a further embodiment of this method, each of the thermal comfort index and the thermal response model can use real-time temperature data inside the premises as measured in real-time by a thermostat inside the premises.

Another embodiment includes an apparatus. This apparatus includes processing circuitry that is configured to: determine a thermal comfort index for a premises, dispatch a thermostat setpoint signal to the premises to cause an electrical demand reduction event at the premises, and terminate the electrical demand reduction event at the premises prior to a time at which a thermal response model for the premises indicates a temperature inside the premises exceeds the thermal comfort index for the premises.

As noted, the thermal response model can represent how the temperature inside the premises will change as a result of external ambient air conditions while the electrical demand reduction event is active. For example, the processing circuitry can be further configured to: use the thermal response model to estimate the temperature inside the premises while the electrical demand reduction event is active, and use the determined thermal comfort index to estimate a predetermined temperature range inside the premises at which a thermal comfort level of an occupant of the premises will be satisfied, where the processing circuitry is configured to terminate the electrical demand reduction event prior to the estimated temperature inside the premises, while the electrical demand reduction event is active, falling outside of the predetermined temperature range.

In a further embodiment of this apparatus, the processing circuitry is configured to determine the thermal comfort index for the premises using two or more factors selected from the group consisting of: (a) an average air temperature adjacent an occupant of the premises; (b) a mean radiant temperature that quantifies an exchange of radiant heat between the occupant of the premises and an ambient environment within the premises surrounding the occupant; (c) humidity within the premises; (d) air speed within the premises; (c) a metabolic rate of the occupant of the premises; and (f) a clothing insulation of the occupant of the premises. In one such example, the processing circuitry can be configured to determine the thermal comfort index for the premises using each of (a), (b), (c), (d), (c), and (f).

In a further embodiment of this apparatus, the processing circuitry is configured to terminate the electrical demand reduction event at the premises prior to the time at which the thermal response model for the premises indicates the temperature inside the premises falls outside a predicted mean vote index ranging from −0.5 to +0.5.

In a further embodiment of this apparatus, the processing circuitry is configured to terminate the electrical demand reduction event at the premises prior to the time at which the thermal response model for the premises indicates the temperature inside the premises exceeds the thermal comfort index for the premises by utilizing historical data associated with previous instances in which the thermostat setpoint signal was dispatched to the premises to cause previous electrical demand reduction events at the premises.

In a further embodiment of this apparatus, the processing circuitry is further configured to: form a cohort of premises using electrical demand data associated with each of the premises, where the processing circuitry is configured to determine the thermal comfort index for each premises of the cohort of premises, the processing circuitry is configured dispatch the thermostat setpoint signal to each premises of the cohort of premises, and the processing circuitry is configured to terminate the electrical demand reduction event at each premises of the cohort of premises prior to a time at which the thermal response model for each premises of the cohort of premises indicates a temperature inside each premises of the cohort of premises exceeds the thermal comfort index for each premises of the cohort of premises. This processing circuitry can further be configured to aggregate premises-related electrical demand data for a plurality of premises, and this processing circuitry can be configured to form the cohort of premises as a subset of the plurality of premises as those premises having electrical demand data best correlated to a predetermined electrical demand reduction event.

In a further apparatus, method, or other embodiment disclosed herein, future forecast(s) as to potential electrical demand reduction and number of premises able to participate in the load management event can be made. Such a forecast model may involve the use of historic data and technology adoption diffusion curves (e.g., Bass Diffusion Curves) to predict the potential load management capacity in the future. For example, this embodiment can forecast number of smart thermostats eligible for load management event in New York city for every year until 2040. Further, the forecast model can predict the change in external factors, like policy and pricing changes. The forecast model can develop a propensity score, with higher propensity scores corresponding to those premises more likely to adopt, and qualify for, an electrical demand reduction event.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
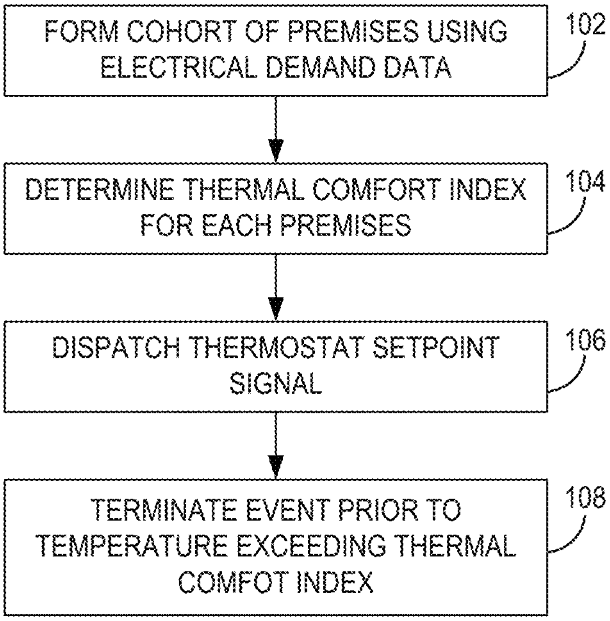
FIG. 1 is a flow diagram of an embodiment of a method for using a thermal response model for a premises and a thermal comfort index associated with an occupant of the premises to terminate an electrical demand reduction event.

Embodiments disclosed herein can implement flexible electric load management in a manner that leverages thermodynamic response and thermal comfort to improve the efficiency and effectiveness of electrical load management. For example, embodiments disclosed herein can determine a thermodynamic response for a given premises and determine a thermal comfort index for that given premises. Such embodiments can then use the thermodynamic response relative to the thermal comfort index to determine a maximum duration of a demand response event (e.g., an event for reducing electrical load demand on the grid) for that given premise. In this way, such embodiments can help to extend the duration of a demand response event, and thereby increase the impact of the load demand reduction on the grid, while at the same time do so in a way that minimizes, or prevents, thermal discomfort at the given premises as a result of the demand response event, thereby decreasing the chances that the customer associated with that given premises will opt of the demand response event. Moreover, as this technique is expanded across many individual premises, the ability to improve the efficiency and effectiveness of electrical load management can be compounded.

As such, embodiments disclosed herein can manage customer/premises behind-the-meter loads in an individual, tailored manner specific to a given customer/premises determined thermodynamic response and thermal comfort. And, furthermore, such embodiments disclosed herein can manage customer/premises behind-the-meter loads in this individual, tailored manner integrated across a plurality of different customers/premises to meet a total targeted demand reduction. Customers' electricity consumption profiles and house thermal response to outside air conditions can be used to identify the flexible load that can be managed and for how long of a time duration. For the example of HVAC loads, customers/premises can be grouped in cohorts (e.g., comprising a plurality of different customers/premises) by evaluating profiles of electricity consumption and premises thermal response to local outside air conditions. The grouping and sequencing of such cohorts can be determined by matching an electrical utility's objective in terms of timing of load relief needs on that utility's electrical system, and location on the electrical distribution grid, then one or more customized load management events can be dispatched by sending a signal to turn off the HVAC system at such select, cohort member premises for a time duration that can be set by the thermal comfort response model associated with each such premises of the cohort. In one embodiment, this event dispatch can take place using real-time feedback from the thermal comfort model, where the event can be initiated and terminated based on the thermal comfort index inside the given premises. In another alternative or additional embodiment, this event dispatch can take place using the thermal response and comfort level change predictions for each premises in the cohort before the event takes place, where the event is modeled prior to the dispatch occurring so as to simulate the given premises' response, thereby helping to identify one or more optimum event parameters in isolation from real-time feedback. The dispatch signal can be staggered across many such modeled customers/premises to get the same impact as turning off HVAC for a long time and avoiding issues in prior approaches.

Before turning to the description of various embodiments, a brief summary of demand response is set forth here. Electrical utilities can run smart thermostat demand response (DR) programs to minimize peaks during high and critical electrical load periods during which there is either a generation resource scarcity or the price of avoiding procuring/building another resource far exceeds the costs to run utility DR programs. While DR programs achieve the desired load reduction directly after their dispatch, load reduction is not consistent throughout the event period. In traditional DR programs, there is an often-ignored crucial post-event impact—referred to as snapback—that can negate the impact of the DR program by causing new peaks or by drastically reducing the overall impact on the load duration curves. These two issues are often exacerbated not just by the reduction in the impact but also by the addition of loads during the snapback period. As participation increases, unmanaged and blanket event-calling can do more harm than benefit.

With this context in mind, embodiments disclosed herein can help to solve these demand response issues as to diminishing load reduction and snapback. Embodiments disclosed herein can utilize a staggered cohort-based, relatively light-touch event-calling operational mechanism, which can leverage determined thermal comfort as the basis for ending the dispatch event. This approach, rooted in advanced data analytics, can provide benefits to a more sustainable and reliable DR program implementation and growth, for instance, because the relatively light-touch nature of the embodiments disclosed herein can help to reduce customer discomfort and associated DR override/opt-out issues. For example, certain embodiments disclosed herein can form customer/premises cohorts using, at least, energy consumption and demographic data while the relatively light-touch execution can be achieved by applying constraints such as avoiding predetermined discomfort levels associated with each given customer/premises in the cohort by ending the dispatch event before such predetermined discomfort level is reached, thereby helping to limit the number needed over a given time period to achieve the utility's electrical demand reduction goal.

Figure 11:
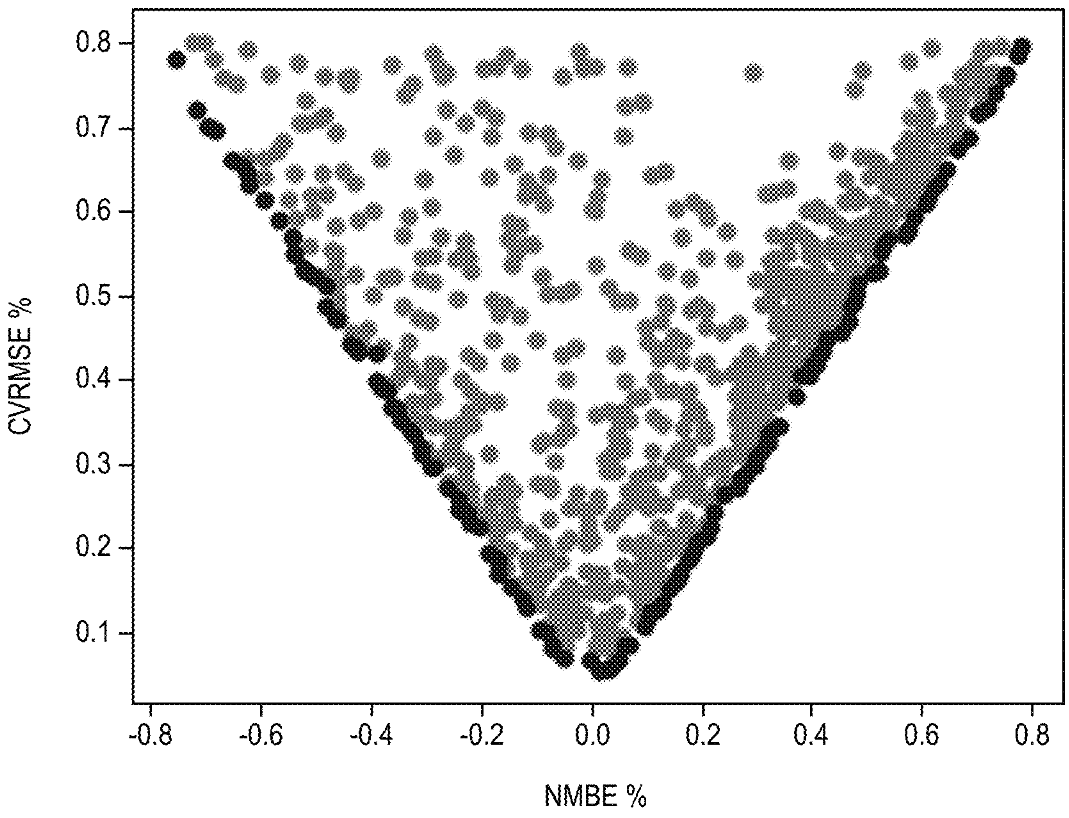
FIG. 11 is an exemplary plot showing representative simulations that can be selected for use in a demand reduction event.

A first step can be to build a digital twin of a whole premises building. The inventors have discovered that this approach can successfully calibrate an energy model that meets ASHRAE Guidelines 14 and even provide better options than the guideline requirements. As digital twining is used for different purposes, deciding on a subset of representative simulations is not a simple task. Referring to FIG. 11, an exemplary plot is shown of representative simulations that can be selected for use in a demand reduction event. As shown at FIG. 11, there are many points that have relatively low error, and choosing the lowest error might cause false precision and sacrifice accuracy while selecting all points that meet ASHRAE Guidelines 14 might bring low value simulations to the mix. There is also the potential situation of no simulations meeting the minimum requirements for calibration.

Selecting simulations that: (i) meet ASHRAE Guidelines 14 for monthly data calibration, (ii) meet ASHRAE Guidelines 14 for hourly data calibration, (ii) lie on the Pareto Front (red dots shown in FIG. 11 forming lower/outer bound of "V" shaped plot) and (iv) have the smallest error can provide better results in identifying building characteristics.

Referring now to FIG. 1, FIG. 1 is a flow diagram of an embodiment of a method 100. The method 100 can be executed to, at a first time, dispatch a thermostat setpoint signal to at least one premises to cause an electrical demand reduction event at the premises and to, at a second, later time, terminate the electrical demand reduction event at the premises using a thermal response model for the premises and a thermal comfort index associated with an occupant of the premises.

At step 102, the method 100 includes forming a cohort of premises, from a larger group of premises, using electrical demand data associated with each of the premises in that larger group of premises. For example, to form a subset, cohort of premises, premises-related electrical demand data can be aggregated for a plurality of premises. Then the cohort of premises can be formed as a subset of the plurality of premises as those premises having electrical demand data best correlated to a predetermined electrical demand reduction event.

Aggregating electrical demand data for a plurality of premises can include extracting and transforming premises-related data for each of the plurality of premises over a predetermined period of time (e.g., the prior twelve months). For instance, premises data can be premises-related electrical demand data that is aggregated for a plurality of premises over the predetermined period of time, and the cohort of premises can be formed as a subset of the plurality of premises as those premises having electrical demand data, over that predetermined period of time, best correlated to a predetermined electrical demand reduction event (e.g., a utility's predetermined electrical demand reduction threshold for a given time). As one such example in aggregating this data, a forecasting model can be used, and this forecasting model can be trained by extracting energy usage data over the predetermined period of time from a data lake storage and this data can be loaded into a machine learning compute node to forecast the day ahead load.

Figure 2:
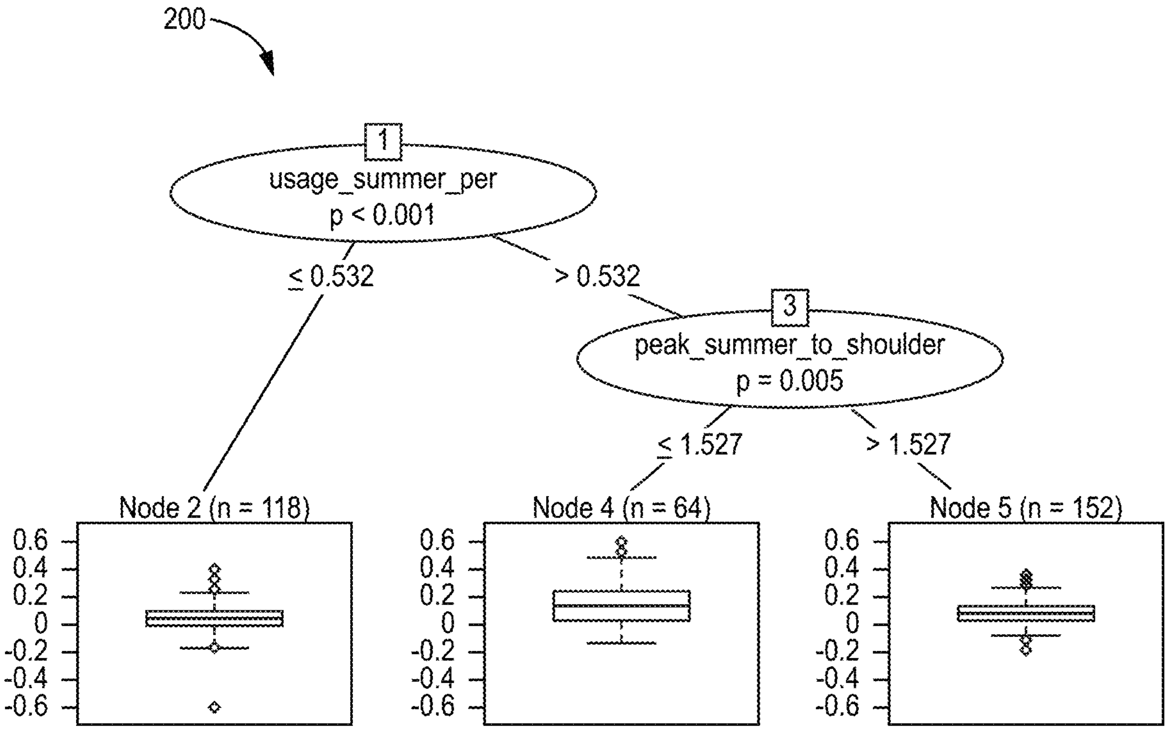
FIG. 2 is a schematic representation of an embodiment of a statistical model for forming a cohort of premises using electrical demand data associated with each of the premises.

FIG. 2 illustrates a schematic representation of an embodiment of a statistical model 200 for forming a cohort of premises using electrical demand data associated with each of the premises. The exemplary statistical model illustrated at FIG. 2 can be referred to as a conditional tree model for use in forming one or more cohorts of premises to be targeted for an electrical demand reduction event, for instance, in manner that optimizes the impact of the electrical demand reduction event by targeting a cohort of premises that is most likely to result in a greatest impact on electrical demand reduction. As one example for forming the cohort of premises as a subset of the plurality of premises, after calling multiple events, a conditional inference tree algorithm model can be used to find premises that have a high impact during the event duration (e.g., those premises corresponding to "Node 5"). Executing such conditional inference tree algorithm model can ascertain premises that correspond to a high demand rate and identify when energy market pricing is highest to make the largest impact from the demand reduction event.

Figure 3:
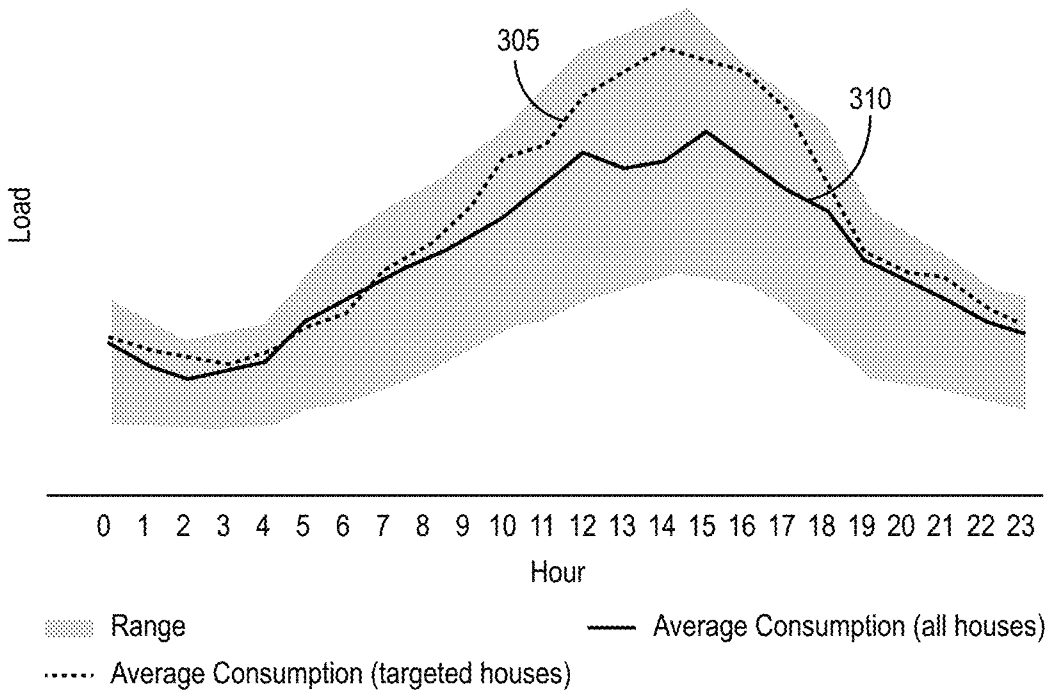
FIG. 3 is an exemplary plot showing one plot representing an electrical load shape of targeted, cohort premises and another plot representing an electrical load shape of all premises.

FIG. 3 is an exemplary plot showing one plot 305 representing an electrical load shape of targeted, cohort premises and another plot 310 representing an electrical load shape of all premises, including the cohort premises. As can be seen at FIG. 3, by forming a cohort of premises to target for the electrical demand reduction event, the impact of the electrical demand reduction event can be increased. Namely, the plot 305 representing an electrical load shape of targeted, cohort premises shows a greater electrical load shape than the plot 310 representing an electrical load shape of all premises. Accordingly, because the targeted, cohort premises have a greater electrical demand profile than the average across all premises, by targeting the cohort of premises as a subset of all premises the impact of the electrical demand reduction can be increased as compared to executing an electrical demand reduction event across a randomized grouping of premises.

At step 104, the method 100 includes determining a thermal comfort index for each premises in the cohort of premises (formed at step 102), and the determined thermal comfort index can be used in executing an electrical demand reduction event across each of the premises in the cohort of premises.

The determined thermodynamic response model can be a representation of how a premises will respond to outside air conditions when the premises HVAC system is on or off. As such, the determined thermodynamic response model can be used to predict the temporal profile of the indoor temperature of the premises. The determined thermodynamic response model takes the following form:

$$\dot{Q}_{in} = \dot{Q}_{HVAC} + C\frac{dT}{dt}$$

where $\dot{Q}_{in}$ is a rate of heat gained from the outside of the premises; $\dot{Q}_{HVAC}$ is a rate of heat removal at the premises caused by a HVAC system at the premises; C is a thermal capacity of the premises; and $$\frac{dT}{dt}$$

is the rate of change of inside air temperature.

Over the course of a given day, changes in internal premises temperature can be ignored (e.g., $$\left(\text{e.g., } \frac{dT}{dt} \approx 0\right)$$

) and premises HVAC system runtime can be correlated with premises outside air temperature and premises thermostat temperature setpoint. Thus, $\dot{Q}_{HVAC}$ as the rate of heat gain/removal at the premises caused by a HVAC system at the premises can be determined as follows:

$$U(T_{outdoors} - T) = \dot{Q}_{HVAC}$$

$$\text{System Energy Consumption} \propto \text{System Run Time} \propto |T_{setpoint} - T_{outdoors}|$$

where U is the heat transfer coefficient associated with the premises; T is the premises indoor air temperature; and $T_{outdoors}$ is the premises outdoor air temperature.

When the premises HVAC system is off, premises house time constant ($\tau_c$) can represent the time during which the premises can respond to a change in premises HVAC system status (i.e. on/off). The time constant ($\tau_c$) can indicate how long an electrical demand reduction event can be called for that premises. For instance, a premises with a larger time constant ($\tau_c$) will experience a relatively milder ramp rate of that premises indoor temperature relative to another premises with a relatively smaller time constant ($\tau_c$). As such, the former premises can be determined as a better candidate for longer events than the latter premises. And, accordingly, selecting the former premises as a member of the cohort of premises can lead to a more impactful electrical demand reduction event.

$$U(T - T_{outdoors}) + C\frac{dT}{dt} = 0$$

When the premises HVAC system is actuated to start back up after being turned off during a given electrical demand reduction event, the premises HVAC system size and additional runtime due to the light-touch event can be estimated. This can allow for a cost-benefit estimation of the electrical demand reduction event where at least a portion of the "cost" associated with executing a given electrical demand reduction event at a given premises can include that estimated additional premises HVAC system runtime as a result of the electrical demand reduction event and where at least a portion of the "benefit" associated with executing the given electrical demand reduction event at the given premises can include a net reduction in electrical demand at that premises.

Figure 4:
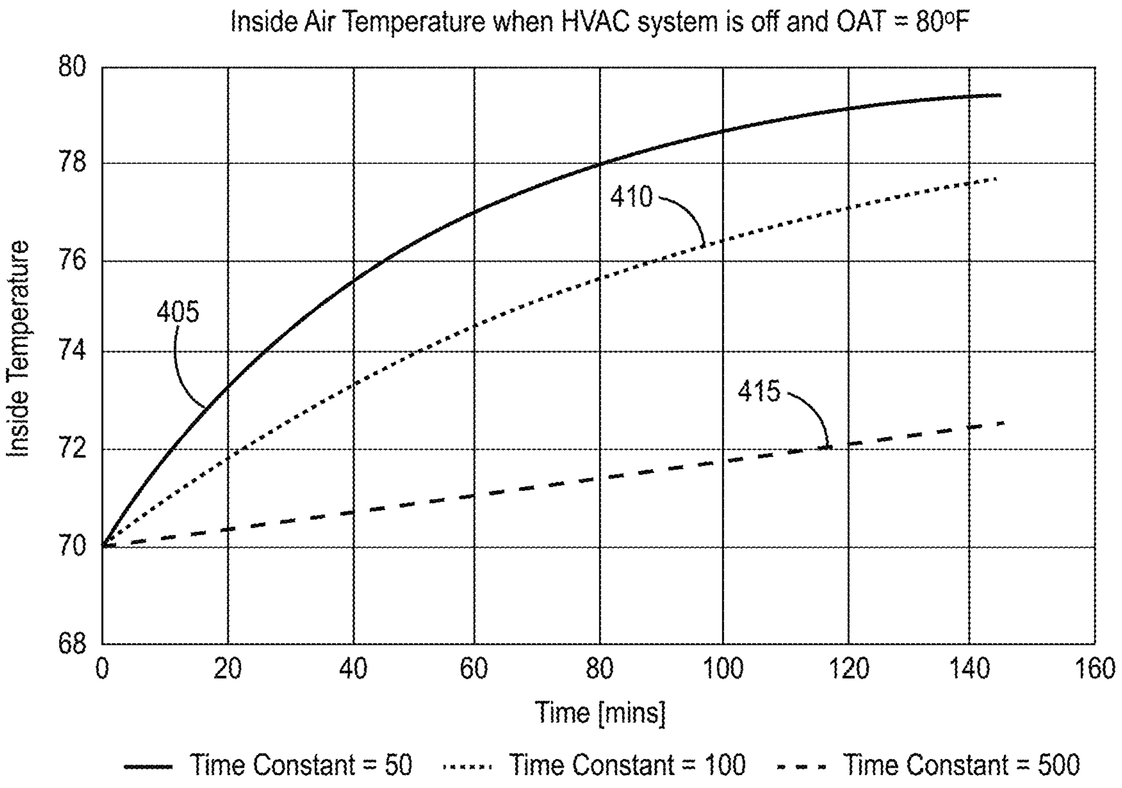
FIG. 4 is an exemplary plot of a premises inside air temperature over time in response to an electrical demand reduction event (e.g., in response to the premises HVAC system receiving a thermostat set point signal) for different time constants.
Figure 5:
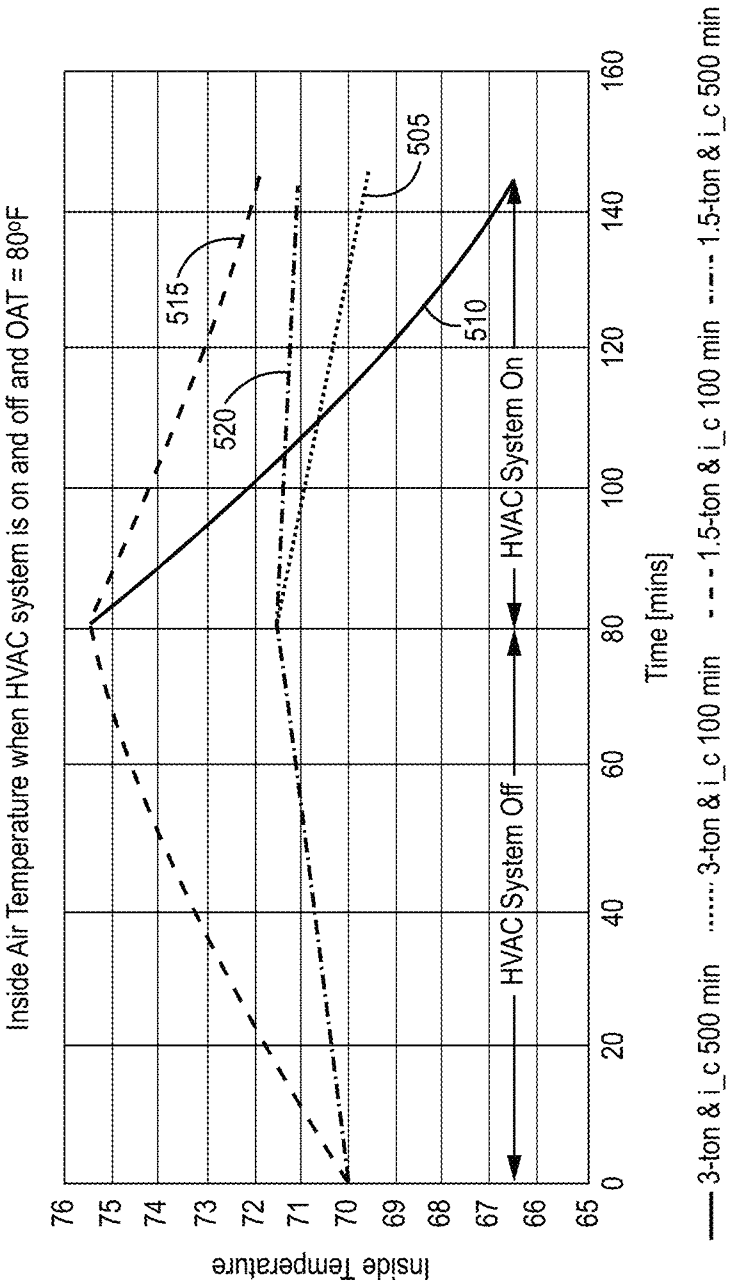
FIG. 5 is an exemplary plot of premises inside air temperature over time in response to an electrical demand reduction event (e.g., in response to the premises HVAC system receiving a thermostat set point signal) followed by a subsequent recovery period (e.g., snapback) for different time constants and premises HVAC system capacities.

To further illustrate use of a thermal comfort index in the context of the impact of a given electrical demand reduction event at a given premises, FIGS. 4 and 5 show plots of premises inside air temperature change over time for different premises-related variables.

FIG. 4 illustrates a premises inside air temperature over time in response to an electrical demand reduction event (e.g., in response to the premises HVAC system receiving a thermostat set point signal) for different time constants. In particular, FIG. 4 plots a premises inside air temperature over time in response to an electrical demand reduction event for a first time constant 405, the premises inside air temperature over time in response to an electrical demand reduction event for a first time constant 410, and the premises inside air temperature over time in response to an electrical demand reduction event for a first time constant 415. As FIG. 4 shows, the rate at which inside air temperature at the premises increases can be a function of the time constant associated with a given electrical demand reduction event and can be selected and executed in a manner so as to increase the time it takes (x-axis) for the premises inside air temperature to increase, thereby increasing the length of the given electrical demand reduction event and, thus, its impact.

FIG. 5 illustrates a plot of premises inside air temperature over time in response to an electrical demand reduction event (e.g., in response to the premises HVAC system receiving a thermostat set point signal) followed by a subsequent recovery period (e.g., snapback) for different time constants and premises HVAC system capacities. As illustrated, each plot includes an inflection point at a time when the premises HVAC system is changed from an off status to an on status. In particular, FIG. 5 plots a premises inside air temperature over time in response to an electrical demand reduction event for a first time constant and first premises HVAC system capacity 505, the premises inside air temperature over time in response to an electrical demand reduction event for a second time constant and the first premises HVAC system capacity 510, the premises inside air temperature over time in response to an electrical demand reduction event for the second time constant and a second premises HVAC system capacity 515, and the premises inside air temperature over time in response to an electrical demand reduction event for the first time constant and the second premises HVAC system capacity 520.

In some embodiments within the scope of this disclosure, a set of factors can be used to track the premises thermal comfort index (TCI). As one example, the thermal comfort index for the premises can be determined using two or more factors selected from the group consisting of: (a) an average air temperature adjacent an occupant of the premises; (b) a mean radiant temperature that quantifies an exchange of radiant heat between the occupant of the premises and an ambient environment within the premises surrounding the occupant (e.g., the uniform temperature of an imaginary enclosure in which the radiant heat transfer from the human body is equal to the radiant heat transfer in the actual non-uniform enclosure such that the mean radiant temperature quantifies the exchange of radiant heat between a human and their surrounding environment, to understand the influence of surface temperatures on personal comfort); (c) humidity within the premises (e.g., a general reference to the average moisture content of the air and can be expressed in terms of several thermodynamic variables, including vapor pressure, dew-point temperature, wet-bulb temperature, humidity ratio, and relative humidity); (d) air speed within the premises (e.g., the average air speed surrounding a representative occupant of the premises, which can be a function of the HVAC system air distribution system design at the premises and whether the premises is equipped with any indoor fan(s)); (e) a metabolic rate of the occupant of the premises (e.g., the rate of transformation of chemical energy into heat and mechanical work by metabolic activities of an individual, per unit of skin surface area (expressed in units of met) equal to 58.2 $W/m^2$ (18.4 $Btu/h{\cdot}ft^2$), which can be the energy produced per unit skin surface area of an average person seated at rest); and (f) a clothing insulation of the occupant of the premises (e.g., the resistance to sensible heat transfer provided by a clothing ensemble, expressed in units of Clo. and such clothing insulation factor can relate to heat transfer from the whole body and, thus, also includes the uncovered parts of the body, such as the head and hands). Factors (a), (b), (c), and (d) are thermodynamic characteristics that can be either measured or modeled. The factors (c) and (f) are occupant characteristics that can be collected from customer surveys or questionnaires or assumed using benchmark values from existing guidelines and standards (e.g., ASHRAE 55 standard). In one particular such example, the thermal comfort index for the premises can be determined using each of (a), (b), (c), (d), (e), and (f).

Typically, participating thermostats can measure premises indoor temperature, and some premises data models can measure premises relative humidity. In the case when the humidity is not directly measured, the rate of moisture generation inside the premises can be modeled to estimate the temporal profile of the premises indoor humidity during the electrical demand reduction event.

As noted, the factors (a), (b), (c), (d), (e), and (f) can serve to identify a premises thermal comfort index. In one example, the premises thermal comfort index can be the predicted mean vote (PMV) index which provides an indication of the thermal sensation of average occupants in the household. The ASHRAE 55 Standard defines a seven-point scale with PMV varying between −3 (feeling cold) to +3 (feeling hot). The standard also recommends a range of PMV between −0.5 and +0.5 to ensure thermal comfort for most typical applications. Using the thermal comfort index according to this example, can, for instance, include terminating the electrical demand reduction event at the premises prior to the time at which the thermal response model for the premises indicates the temperature inside the premises falls outside a predicted mean vote index ranging from −0.5 to +0.5.

Embodiments disclosed herein can leverage the premises thermal comfort index to increase the beneficial impact of an electrical demand reduction event. Namely, the thermal comfort index associated with a given premises can then be used in conjunction with a thermal response model associated with that same premises to determine when to terminate the electrical demand reduction event at the premises. In particular, for example, the electrical demand reduction event at the premises can be terminated prior to a time at which a thermal response model for the premises indicates a temperature inside the premises exceeds the thermal comfort index for the premises. According to such embodiments disclosed herein, by coupling an indoor thermal comfort model with the thermal response model for the given premises of a determined cohort to predict the impact of electrical demand reduction events with various frequencies and lengths on the premises occupants' thermal comfort, the electrical demand reduction event parameters for individual premises can be optimized to minimize the likelihood of premises opt-out and maximize the long-term gains from the demand response program.

Embodiments disclosed herein can utilize historic data on the electrical demand reduction vent program performance and data analytics to calibrate the noted models to capture thermal behavior of the premises and develop a baseline for the premises occupants' thermal comfort level prior to initiating the electrical demand reduction event for that premises. For instance, some premise occupants prefer to keep their household cooler, while others prefer maintaining their HVAC system's setpoint at a warmer setting. Also, some premises occupants can tolerate larger drifts in their thermal comfort level than others. Such variances can be accounted for by calibrating the models using historic premises data, for instance, in forming the cohort subset of premises at step 102 and/or in determining the premises thermal comfort index at step 104.

As noted, the thermal comfort index associated with a given premises can be used in conjunction with a thermal response model associated with that same premises to determine when to terminate the electrical demand reduction event at the premises. Premises data can be used to develop the thermodynamic response model for a given premises and the thermodynamic response model can be used relative to the thermal comfort index during the electrical demand reduction event. The following steps can be executed to develop the thermodynamic response model for the given premises: (i) estimate the ramp rate (i.e., positive in summer and negative in winter) of the premises inside air during the electrical demand reduction event; (ii) estimate the ramp rate of the premises indoor moisture content during the event; (iii) estimate the ramp rate of the premises indoor thermal comfort index; (iv) based on steps (i), (ii), and (iii), and in some instances additionally assumptions for average premises indoor air speed, premises occupant's activity level and clothing, a maximum electrical demand reduction event time duration above which the premises thermal comfort index exceeds the tolerable limit can be identified. Then, at step (v), an electrical load reduction resulting from the electrical demand reduction event at the premises can be estimated. This process can be carried out to estimate an electrical load reduction resulting from the electrical demand reduction event for each of a plurality of premises and used to determine the premises to select for the cohort subset to be included in a given electrical demand reduction event to be executed across that cohort subset of premises.

At step 106, the method 100 can include dispatching a thermostat setpoint signal to each premises of the cohort of premises. For example, the thermostat setpoint signal can be dispatched to those premises in the determined cohort of premises at a time when procuring electrical energy and capacity from the wholesale market is most expensive yet while selecting this time in view of an optimized time (e.g., as determined from the above described modeling) to help align the electrical demand reduction event trigger—the thermostat setpoint signal dispatch—with a suitable time for the given premises.

As one example, a best thermostat setpoint signal dispatch time within a given, preset period of time can be determined by using the thermal response model for each premises of the cohort of premises and the thermal comfort index for each premises of the cohort of premises. This can allow for determining a maximum electrical demand reduction event duration and snapback impact for each premises of the cohort of premises. In one example, the maximum electrical demand reduction event duration and snapback impact for each premises of the cohort of premises can be determined prior to actually implementing the electrical demand reduction event using one or more models disclosed herein. This can include using such one or more models to predict optimal duration of the electrical demand reduction event for each premises, and the electrical demand reduction event parameters (e.g., specific adjusted thermostat temperature setpoint) can communicated with each premises thermostat accordingly. The approach of this example may not utilize real-time feedback or control of thermostat settings. In another example, real-time feedback can be utilized. In such example, the electrical demand reduction event (e.g., specific adjusted thermostat temperature setpoint) can be dispatched to each premises, and the one or more model parameters can be monitored in substantially real-time so as to terminate the electrical demand reduction event (e.g., roll back the adjustment to bring the thermostat temperature setpoint back to its original, pre-electrical demand reduction event temperature setpoint) when the thermal comfort index exceeds the tolerable limit for the given premises.

At step 108, the method 100 can include, as noted, terminating the electrical demand reduction event at each premises of the cohort of premises prior to a time at which the thermal response model for each premises of the cohort of premises indicates a temperature inside each premises of the cohort of premises exceeds the thermal comfort index for each premises of the cohort of premises.

Traditional demand response evaluation, measurement, and verification (DR EM&V) typically utilize data from one or more days prior to the event to create a baseline for consumption during the subsequent event day. Notably, this can impose a challenge as light-touch events can be frequent (e.g., dispatched daily). Embodiments disclosed herein can provide advantages by providing more precise and optimized electrical demand reduction events, and such benefits can be compounded by utilizing the thermal response model for each premises of the cohort of premises to indicate a temperature inside each premises of the cohort of premises so as to determine when the thermal comfort index for each premises of the cohort of premises will be exceeded to increase the duration of an electrical demand reduction event.

Figure 6B:
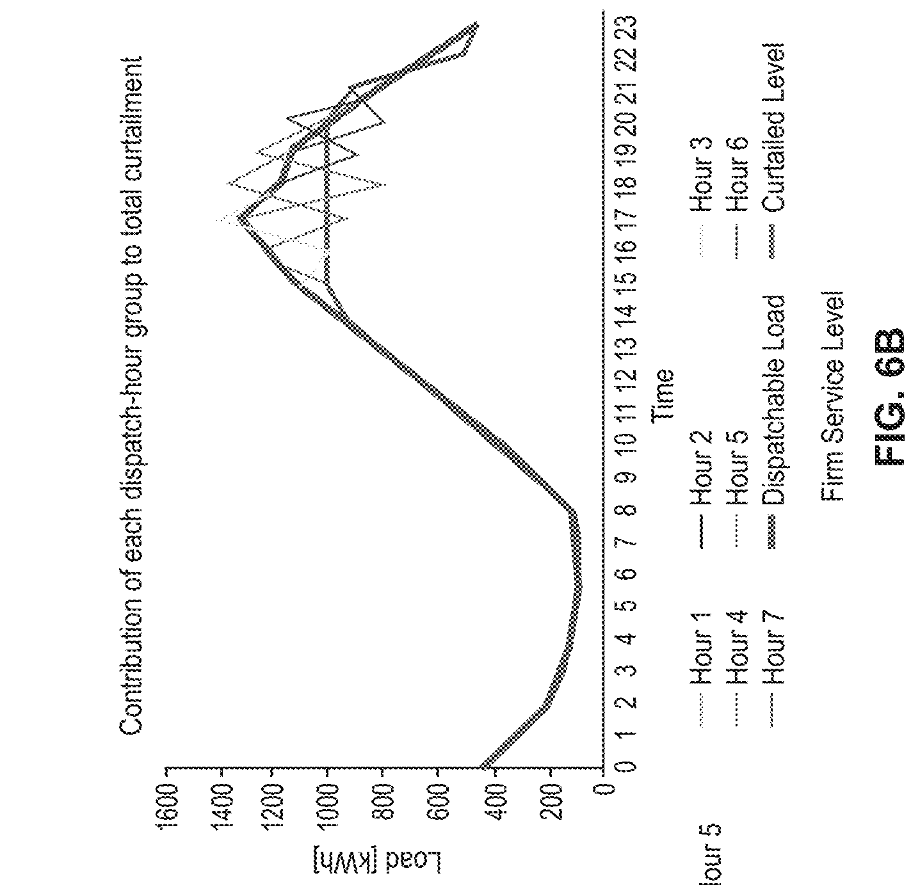
FIGS. 6A and 6B illustrate two exemplary plots demonstrating the use of premises electrical demand reduction event staggering in time and the resulting aggregated total expected electrical load reduction from this staggering in time approach.
Figure 6A:
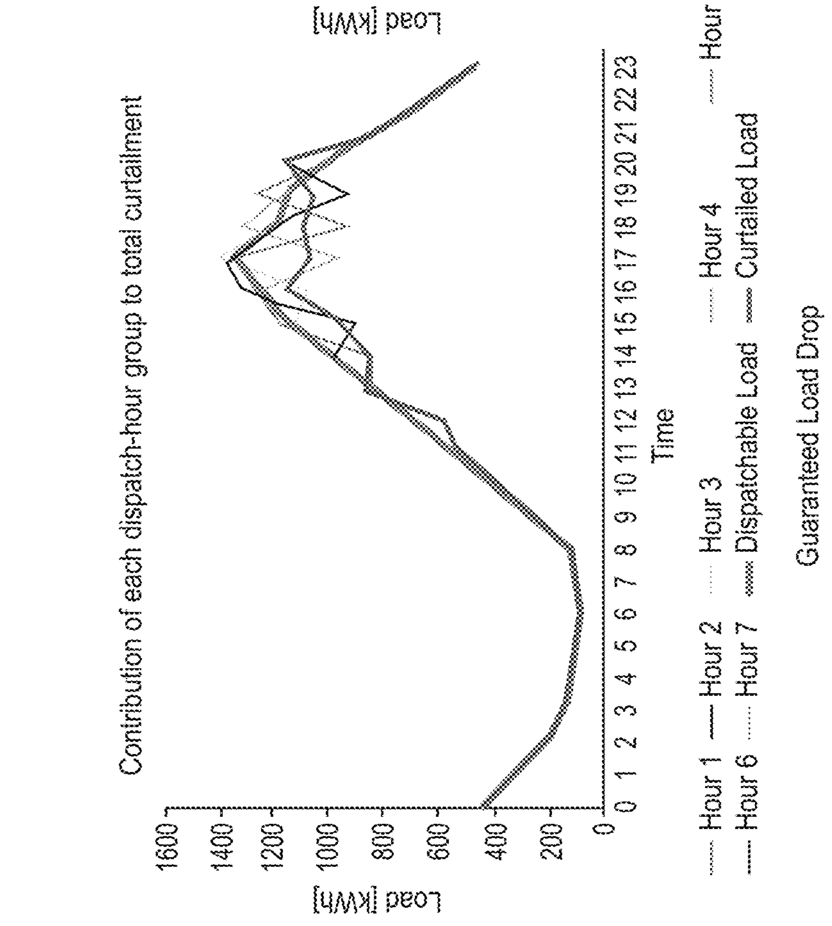

FIGS. 6A and 6B each illustrate the use of premises electrical demand reduction event staggering in time and the resulting aggregated total expected electrical load reduction from this staggering in time approach. As the plots shown at each of FIGS. 6A and 6B illustrate, staggering the dispatch of specific adjusted thermostat temperature setpoints to premises can help to improve the overall impact of the electrical demand reduction event at the macro electrical load demand level (e.g., across a given utility's customer base).

Figure 7:
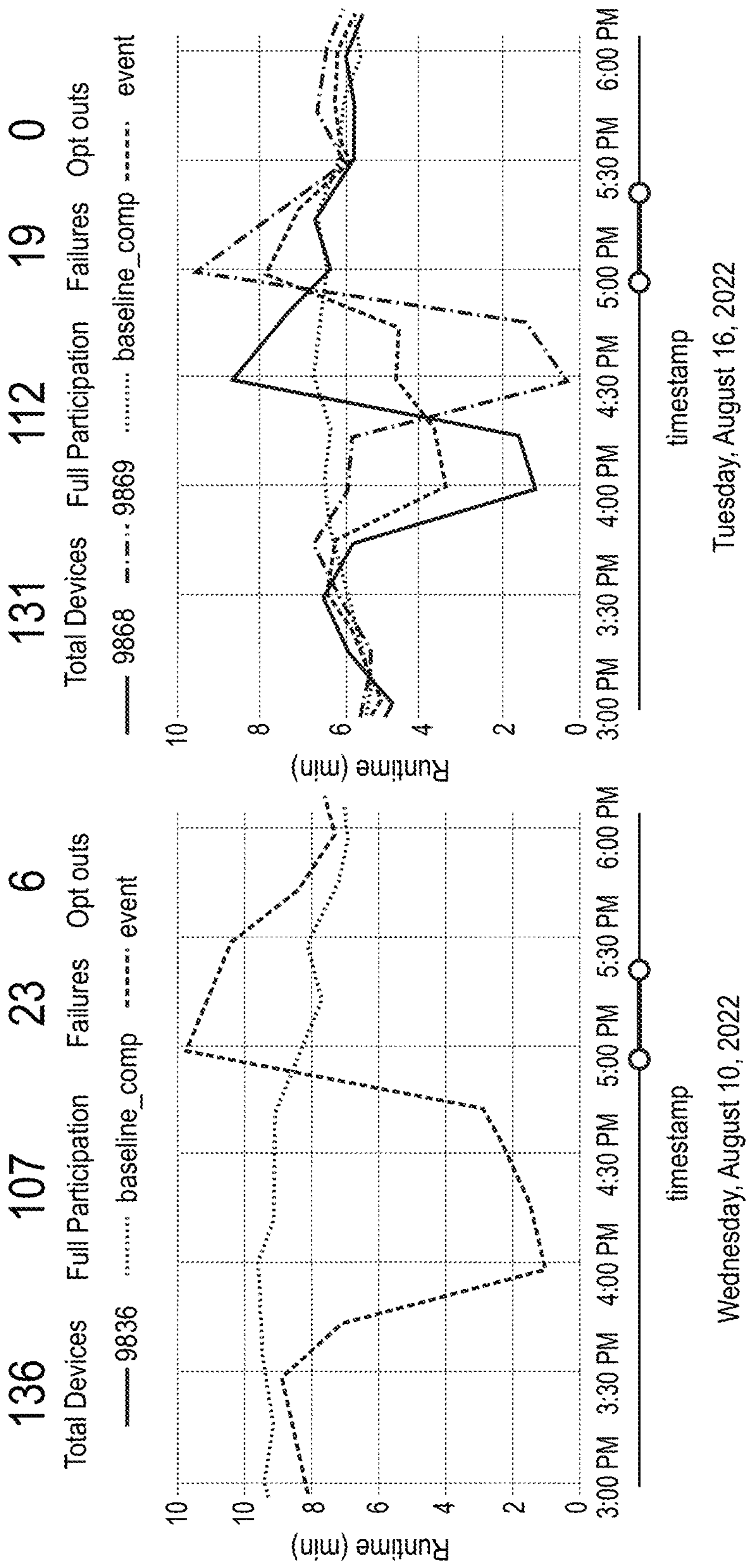
FIG. 7 illustrates a plot comparison of the noted traditional demand response evaluation, measurement, and verification (left-hand plot) and the approach of certain embodiments disclosed herein to stagger, across time, the dispatch of specific adjusted thermostat temperature setpoints to premises (right-hand plot).

FIG. 7 illustrates a plot comparison of the noted traditional demand response evaluation, measurement, and verification (left-hand plot) and the approach of certain embodiments disclosed herein to stagger, across time, the dispatch of specific adjusted thermostat temperature setpoints to premises (right-hand plot). As can be seen from this exemplary illustration, the approach of certain embodiments disclosed herein to stagger, across time, the dispatch of specific adjusted thermostat temperature setpoints to premises can result in more effective and consistent reduction in electrical demand and, thereby, help to reduce electrical load demand on the electrical distribution grid over that time period.

In some embodiments within the scope of the present disclosure, the resulting impact from dispatched thermostat setpoint signal, and thus an impact associated with the electrical demand reduction event, can be measured and reported for settlement.

Figure 8:
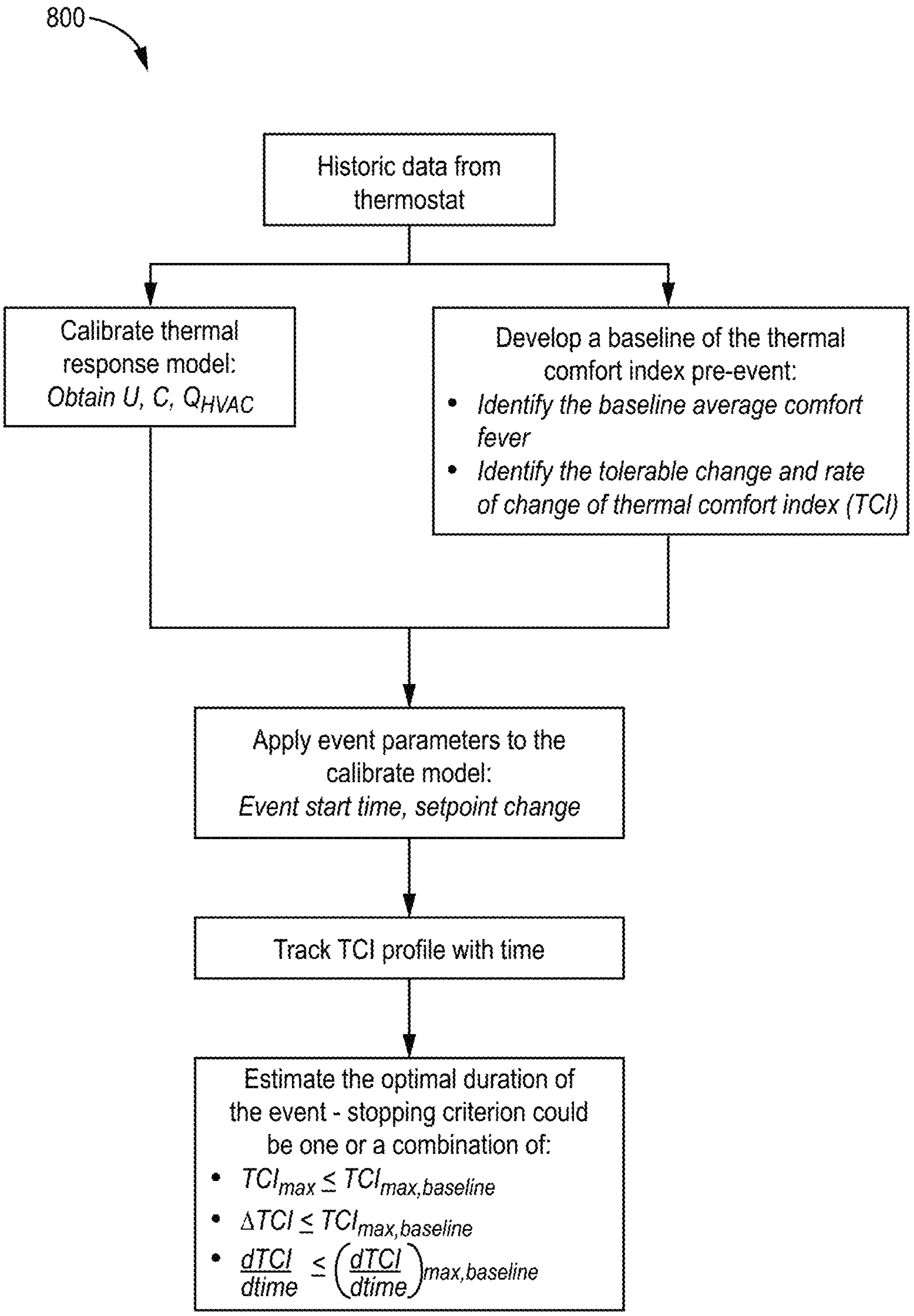
FIG. 8 is a flow diagram illustrating implementation of one particular embodiment of the method, shown at FIG. 1, for using a thermal response model for a premises and a thermal comfort index associated with an occupant of the premises to terminate an electrical demand reduction event.

FIG. 8 is a flow diagram illustrating implementation of one particular method embodiment 800 implementing the method 100 of FIG. 1. Like the method 100, the method 800 can use a thermal response model for a premises and a thermal comfort index associated with an occupant of the premises to terminate an electrical demand reduction event. The illustrated method 800 includes a step for estimating an optimal time duration of an electrical demand reduction event using one or more of the illustrated comparison thresholds associated with the thermal comfort index (TCI) of a given premises.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Example

The following described a non-limiting example of one illustrative embodiment within the scope of the preceding description.

Figure 9:
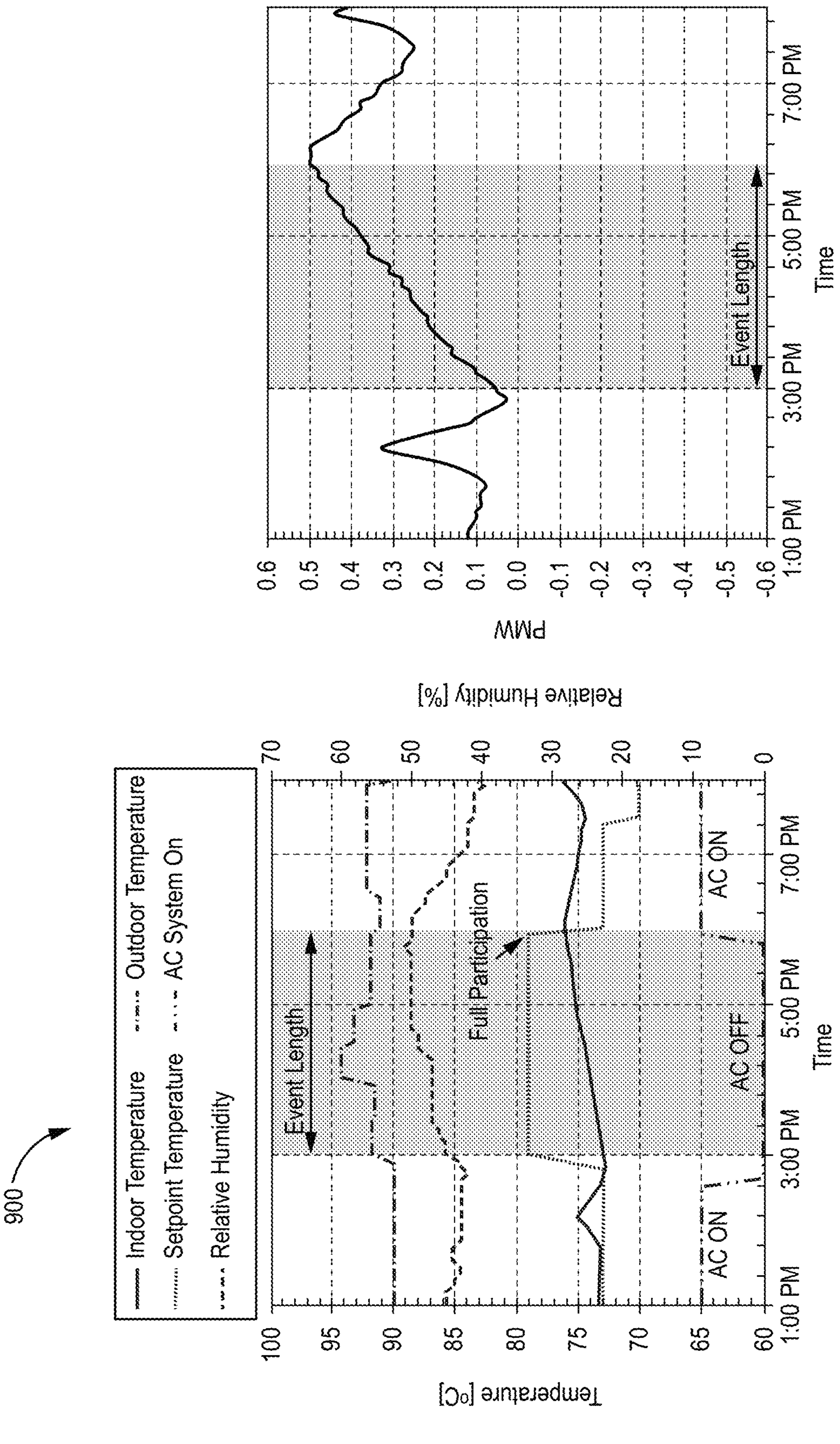
FIGS. 9 and 10 illustrate a comparison of two different premises to illustrate the usefulness of modeling a premises thermal response and predicting the effect of an electrical demand reduction event on the premises indoor thermal comfort, according to one exemplary example described herein. In particular, the left-hand plot at FIG. 9 shows the thermal response and operational dynamics of the HVAC system at a first premises, and the right-hand plot at FIG. 9 shows the predicted mean vote (PMV) profile of that first premises. Similarly, the left-hand plot at FIG. 10 shows the thermal response and operational dynamics of the HVAC system of a second, different premises, and the right-hand plot at FIG. 10 shows the predicted mean vote (PMV) profile of that second premises.
Figure 10:
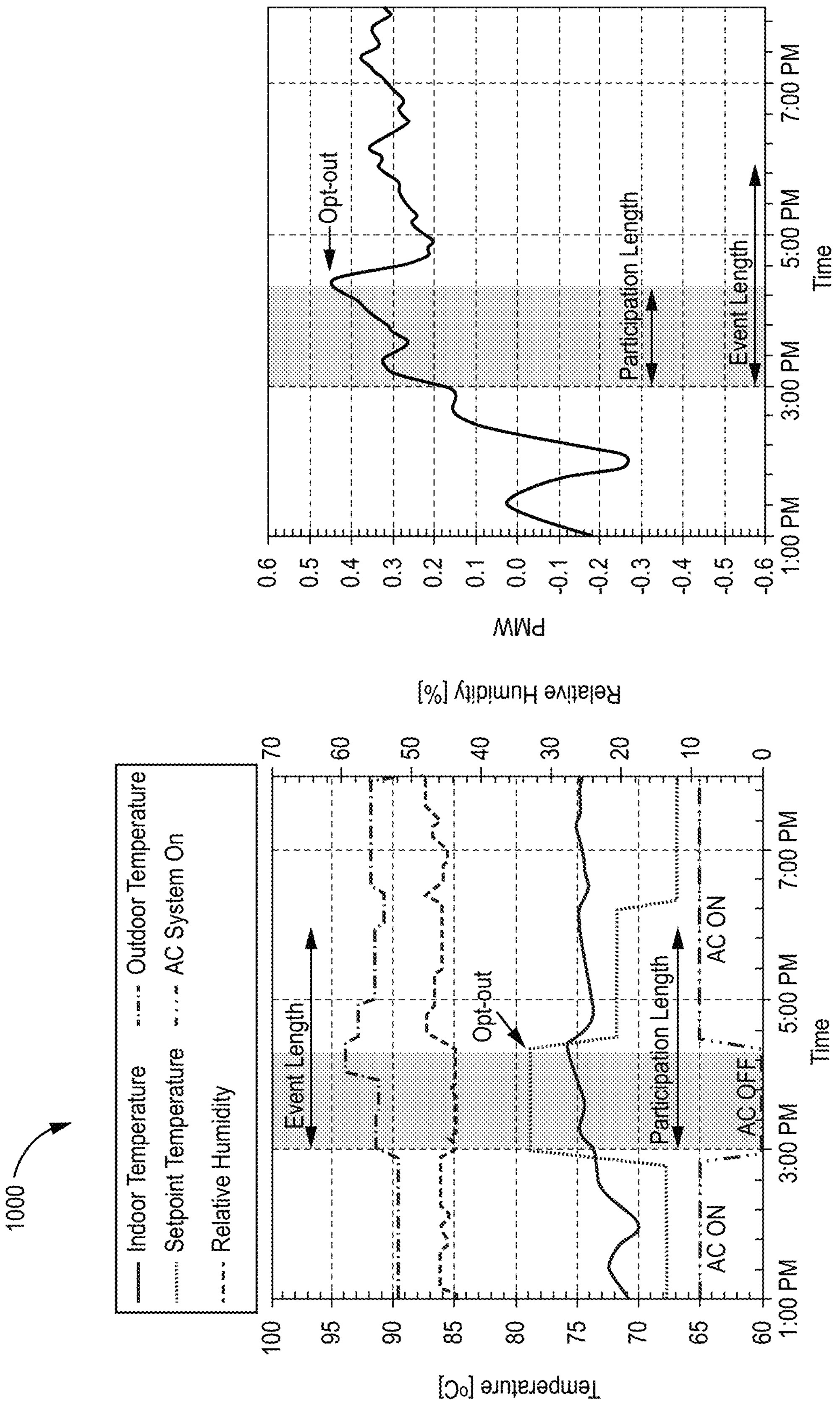

FIGS. 9 and 10 illustrate a comparison of two different premises-premises 900 at FIG. 9 and premises 1000 at FIG. 10—that are subjected to the same electrical demand reduction event. The left-hand plot at FIG. 9 shows the thermal response and operational dynamics of the HVAC system of the premises 900, and the right-hand plot at FIG. 9 shows the predicted mean vote (PMV) profile of the premises 900. Similarly, the left-hand plot at FIG. 10 shows the thermal response and operational dynamics of the HVAC system of the premises 1000, and the right-hand plot at FIG. 10 shows the predicted mean vote (PMV) profile of the premises 1000.

The electrical demand reduction event is initiated at 3:00 PM, signaling each premises 900, 1000 thermostat to increase the setpoint temperature to 79° F. The duration of the event was designed to be three hours, ending at 6:00 PM. Both premises 900, 1000 were subjected to the same weather conditions during the event. However, each premises 900, 1000 had its own unique characteristics. Prior to the event, premises 900 had its air conditioning (AC) running toward a target setpoint of 73° F., whereas premises 1000 had its thermostat set to 68° F. At the onset of the event, the average indoor temperature of premises 900 was seen to be close to 73° F., explaining why the AC system cycled off 30 minutes prior to the event start. On the other hand, the AC system of premises 1000 seemed not able to drop the indoor temperature prior to the event, probably due to a variety of reasons such as an undersized or inefficient AC system, a leaky envelope, or infiltration due to frequent operation of windows and doors. At the beginning of the event, the indoor temperature of premises 1000 was close to 74° F. During the event the setpoint temperature at premises 1000 is adjusted to 79° F., resulting in the AC system being cycled off. It can be noticed that the thermal response of premises 900 is significantly slower than that of premises 1000, indicating premises 900 has a tighter envelope than premises 1000. A comparison of FIGS. 9 and 10 illustrates that the average indoor temperatures of premises 900 and premises 1000 exceeding 75° F. at 5:00 PM and 4:00 PM, respectively. In applying an "Analytical Comfort Zone Method" delineated in ANSI/ASHRAE Standard 55 to both premises 900, 1000, it was observed that premises 900, 1000 approached the threshold PMV for indoor thermal comfort (e.g., PMV=+0.5) at 6:00 PM and 4:40 PM, respectively. This indicates that premises 900 was able to participate in the whole event without discomfort, while premises 1000 reached the comfort limit and ended the event at 4:40 PM (i.e. earlier than premises 900).

Notably, it may be expected that designing and dispatching electrical demand reduction events without proper consideration of the resulting effect on premises indoor thermal comfort will likely impart a negative impression on the occupant/owner of premises 1000, discouraging that occupant/owner from fully participating in all events. As such, there is significant potential in dispatching a larger number of shorter duration electrical demand reduction events to premises 1000 as guided by the modeled prediction of when premises 1000 is likely to opt out from the event, as opposed to implementing fewer, longer duration events. Tracking the effect of a given electrical demand reduction event on premises indoor thermal comfort can help to cause the electrical demand reduction event to execute undetected by the premises occupant/owner.

Thus, the example described here and illustrated at FIGS. 9 and 10 highlights the usefulness of modeling the thermal response of the different premises participating in one or more electrical demand reduction events and predicting the effect of such one or more events on premises indoor thermal comfort. Integrating premises thermal comfort relative to premises thermal response into electrical demand reduction event design can help to ensure customization for each individual premises based on that premises' unique characteristics and predicted response to the electrical demand reduction event(s).

After identifying the limit of discomfort for each premises 900, 1000 (e.g. 3 hours for premises 900 and 1.66 hours for premises 1000), a Mixed Linear Integer Programming (MILP) optimization can be used to determine which premises is dispatched starting at which time that the total load associated with the electrical demand reduction event meet different objectives. Each selected premises of a cohort and the dispatch time combination can be initially assigned a binary value of 0 which means no dispatch (default). Premises can then be assigned a value of 1 at those dispatch times (e.g., within a given time period, such as a 24-hour period) that maximize the benefit calculated as associated with the dispatch event. Optimization of the impact of the electrical demand reduction event can be achieved within the determined constraints on the duration of the electrical demand reduction event for a given premises and on how many times per time period (e.g., each day) the premises load is managed. As illustrated at FIG. 5, load reduction from individual premises can be staggered and aggregated to meet a predetermined, aggregate electrical load reduction and/or to help ensure that the aggregated electrical load does not exceed a specific, predetermined value for a corresponding time period.

The approach described at the present example here can be executed across a determined cohort of premises (e.g., across 130 premises to control 130 smart thermostat devices at each such premises). For this exemplary approach, the first step was to run a 1-hour electrical demand reduction event for all premises within the determined cohort and calculate the thermal response and identify comfort thresholds for this initial, 1-hour electrical demand reduction event. Next, premises were grouped into two 30-min groups that were staggered in dispatch signal initiation to achieve consistent load reduction over one hour as resulting from the two separated and staggered 30-min events.

Various examples of the disclosure have been described. Any combination of the described systems, operations, or functions is contemplated. These and other examples are within the scope of the following claims.

What is claimed is:

1. A method comprising the steps of:

determining a thermal comfort index for a premises;

dispatching a thermostat setpoint signal to the premises to cause an electrical demand reduction event at the premises; and terminating the electrical demand reduction event at the premises prior to a time at which a thermal response model for the premises indicates a temperature inside the premises exceeds the thermal comfort index for the premises;

using the thermal response model to estimate the temperature inside the premises while the electrical demand reduction event is active; and using the determined thermal comfort index to estimate a predetermined temperature range inside the premises at which a thermal comfort level of an occupant of the premises will be satisfied, wherein the electrical demand reduction event is terminated prior to the estimated temperature inside the premises, while the electrical demand reduction event is active, falling outside of the predetermined temperature range;

wherein the thermal response model for the premises is determined using a digital twin framework that comprises searching a database of a plurality of prototypical premises thermal response models and selecting one of the pluralities of prototypical premises thermal response models from the database that best corresponds to a consumption profile of the premises, and wherein the selected one of the pluralities of prototypical premises thermal response models is used to predict the thermal comfort index for use in terminating the electrical demand reduction event at the premises.

2. The method of claim 1, wherein the thermal response model represents how the temperature inside the premises will change as a result of external ambient air conditions while the electrical demand reduction event is active.

3. The method of claim 1, wherein the thermal response model estimates the temperature inside the premises while the electrical demand reduction event is active using an estimated rate of heat gain, $\dot{Q}_{in}$, that is determined for the premises as follows:

$$\dot{Q}_{in} = \dot{Q}_{HVAC} + C\frac{dT}{dt}$$

wherein: $\dot{Q}_{HVAC}$ is a rate of heat removal at the premises caused by a HVAC system at the premises; C is a thermal capacity of the premises; and $$\frac{dT}{dt}$$

is the rate of change of inside air temperature.

4. The method of claim 3, wherein $$\frac{dT}{dt} \approx 0,$$

and wherein $\dot{Q}_{HVAC}=U(T_{outdoors}-T)$, with U being a heat transfer coefficient for the premises, T being an indoor air temperature within the premises, and $T_{outdoors}$ being an outdoor ambient air temperature outside the premises.

5. The method of claim 1, further comprising:

forming a cohort of premises using electrical demand data associated with each of the premises, and wherein the thermal comfort index is determined for each premises of the cohort of premises, wherein the thermostat setpoint signal is dispatched to each premises of the cohort of premises, and wherein the electrical demand reduction event is terminated at each premises of the cohort of premises prior to a time at which the thermal response model for each premises of the cohort of premises indicates a temperature inside each premises of the cohort of premises exceeds the thermal comfort index for each premises of the cohort of premises.

6. The method of claim 5, wherein premises-related electrical demand data is aggregated for a plurality of premises, and wherein the cohort of premises is formed as a subset of the plurality of premises as those premises having electrical demand data best correlated to a predetermined electrical demand reduction event.

7. The method of claim 1, wherein the thermal comfort index for the premises is determined using two or more factors selected from the group consisting of: (a) an average air temperature adjacent an occupant of the premises; (b) a mean radiant temperature that quantifies an exchange of radiant heat between the occupant of the premises and an ambient environment within the premises surrounding the occupant; (c) humidity within the premises; (d) air speed within the premises; (e) a metabolic rate of the occupant of the premises; and (f) a clothing insulation of the occupant of the premises.

8. The method of claim 7, wherein the thermal comfort index for the premises is determined using each of (a), (b), (c), (d), (e), and (f).

9. The method of claim 1, wherein the electrical demand reduction event is terminated at the premises prior to the time at which the thermal response model for the premises indicates the temperature inside the premises falls outside a predicted mean vote index ranging from −0.5 to +0.5.

10. The method of claim 1, wherein terminating the electrical demand reduction event at the premises prior to the time at which the thermal response model for the premises indicates the temperature inside the premises exceeds the thermal comfort index for the premises comprises utilizing historical data associated with previous instances in which the thermostat setpoint signal was dispatched to the premises to cause previous electrical demand reduction events at the premises.

11. The method of claim 1, wherein each of the thermal comfort index and the thermal response model use real-time temperature data inside the premises as measured in real-time by a thermostat inside the premises.

12. An apparatus comprising processing circuitry configured to:

determine a thermal comfort index for a premises;

dispatch a thermostat setpoint signal to the premises to cause an electrical demand reduction event at the premises;

terminate the electrical demand reduction event at the premises prior to a time at which a thermal response model for the premises indicates a temperature inside the premises exceeds the thermal comfort index for the premises;

use the thermal response model to estimate the temperature inside the premises while the electrical demand reduction event is active;

use the determined thermal comfort index to estimate a predetermined temperature range inside the premises at which a thermal comfort level of an occupant of the premises will be satisfied, wherein the processing circuitry is configured to terminate the electrical demand reduction event prior to the estimated temperature inside the premises, while the electrical demand reduction event is active, falling outside of the predetermined temperature range; and form a cohort of premises using electrical demand data associated with each of the premises, wherein the processing circuitry is configured to determine the thermal comfort index for each premises of the cohort of premises, wherein the processing circuitry is configured dispatch the thermostat setpoint signal to each premises of the cohort of premises, and wherein the processing circuitry is configured to terminate the electrical demand reduction event at each premises of the cohort of premises prior to a time at which the thermal response model for each premises of the cohort of premises indicates a temperature inside each premises of the cohort of premises exceeds the thermal comfort index for each premises of the cohort of premises, and wherein the processing circuitry is configured to aggregate premises-related electrical demand data for a plurality of premises, and wherein the processing circuitry is configured to form the cohort of premises as a subset of the plurality of premises as those premises having electrical demand data best correlated to a predetermined electrical demand reduction event.

13. The apparatus of claim 12, wherein the thermal response model represents how the temperature inside the premises will change as a result of external ambient air conditions while the electrical demand reduction event is active.

14. The apparatus of claim 12, wherein the processing circuitry is configured to determine the thermal comfort index for the premises using two or more factors selected from the group consisting of: (a) an average air temperature adjacent an occupant of the premises; (b) a mean radiant temperature that quantifies an exchange of radiant heat between the occupant of the premises and an ambient environment within the premises surrounding the occupant; (c) humidity within the premises; (d) air speed within the premises; (e) a metabolic rate of the occupant of the premises; and (f) a clothing insulation of the occupant of the premises.

15. The method of claim 12, wherein the processing circuitry is configured to terminate the electrical demand reduction event at the premises prior to the time at which the thermal response model for the premises indicates the temperature inside the premises falls outside a predicted mean vote index ranging from −0.5 to +0.5.

16. The method of claim 12, wherein the processing circuitry is configured to terminate the electrical demand reduction event at the premises prior to the time at which the thermal response model for the premises indicates the temperature inside the premises exceeds the thermal comfort index for the premises by utilizing historical data associated with previous instances in which the thermostat setpoint signal was dispatched to the premises to cause previous electrical demand reduction events at the premises.

* * * * *